United States Patent [19]

Tsubone et al.

[11] Patent Number: 4,463,861
[45] Date of Patent: Aug. 7, 1984

[54] SHEET FOR FORMING SLEEVE AND PROCESS FOR PRODUCING THE SAME

[75] Inventors: Masahiro Tsubone; Bon Machida, both of Koga, Japan

[73] Assignee: Sekisui Kaseihin Kogyo Kabushiki Kaisha, Nara, Japan

[21] Appl. No.: 458,135

[22] Filed: Jan. 14, 1983

[30] Foreign Application Priority Data

| Jan. 14, 1982 [JP] | Japan | 57-4294 |
| Jan. 18, 1982 [JP] | Japan | 57-6664 |
| Mar. 2, 1982 [JP] | Japan | 57-33678 |
| Mar. 9, 1982 [JP] | Japan | 57-37542 |
| Aug. 11, 1982 [JP] | Japan | 57-140378 |
| Oct. 22, 1982 [JP] | Japan | 57-186399 |

[51] Int. Cl.³ .................. B65D 11/16; B32B 1/08; B32B 3/26; B32B 27/06
[52] U.S. Cl. .................. 215/12 R; 215/DIG. 6; 264/45.9; 264/46.1; 264/514; 428/35; 428/36; 428/318.6; 428/318.8; 428/519; 428/910; 428/913
[58] Field of Search .............. 428/35, 314.4; 215/12 R, DIG. 6; 264/45.9, 46.1, 514, 36, 314.8, 318.6, 318.8, 319.7, 515, 519, 910, 913

[56] References Cited

U.S. PATENT DOCUMENTS

| 3,317,363 | 5/1967 | Weber | 428/318.8 |
| 3,619,344 | 11/1971 | Wolinski et al. | 428/314.4 |
| 3,760,968 | 9/1973 | Amberg et al. | 428/35 |
| 3,861,994 | 1/1975 | Stark | 428/314.8 |
| 3,979,000 | 9/1976 | Karabedian | 428/35 |
| 4,069,934 | 1/1978 | Karabedian | 428/35 |

*Primary Examiner*—William J. Van Balen
*Attorney, Agent, or Firm*—Armstrong, Nikaido, Marmelstein & Kubovcik

[57] ABSTRACT

A sleeve and method of making the same comprising a laminate sheet having a more highly shrinkable foamed film and a lesser shrinkable non-foamed film, the ends of the laminate being bonded together so that the foamed film faces the interior of the sleeve. The foamed film has a thicker surface layer on its side opposite that laminated to the non-foamed layer, which therefore faces the interior of the sleeve.

The flow direction shrinkage rate of the laminated sheet, which is 60% or less, is greater than the widthwise shrinkage rate of the laminated film. The widthwise shrinkage rate is 10% or less.

13 Claims, 5 Drawing Figures

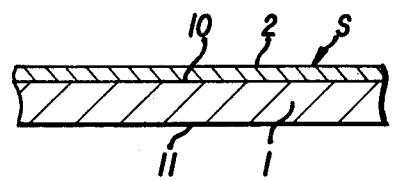
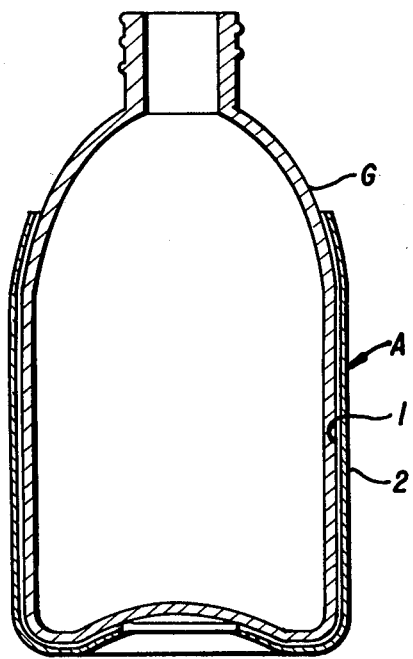

SHEET FOR FORMING SLEEVE AND PROCESS FOR PRODUCING THE SAME

BACKGROUND OF THE INVENTION

1. Field of the Invention

The present invention relates to a sheet for forming a sleeve to be used as a protective cover for a fragile article, such as a glass bottle.

2. Description of the Prior Art

Fragile articles, such as glass bottles, have been protected by covering the outer surface thereof with a sleeve comprising a shrinkable synthetic resin; applying heat to heatshrink the sheet so as to form a covering tightly connected to the outer surface of the article.

As shrinkable sheets for forming such a sleeve, foamed polystyrene resins have been used (see, for example, U.S. Pat. No. 3,760,968). With such polystyrene sheets, sleeves with good shock-absorbing properties can be obtained. However, such sleeves have a poor surface smoothness and printability and the surface thereof is susceptible to scratches. Further, glass bottles covered with a sleeve of heat-shrunk polystyrene resins have poor surface slippage properties so that, when continuously transported by a vibration conveyor or the like, they may not move smoothly and, in fact, may come to a halt.

Accordingly, it is an object of the present invention to provide a sheet for forming a sleeve which is not only free from such disadvantages, but also have excellent printability and surface smoothness.

On the other hand, in cases where heat-shrinkable sheets are applied to glass bottles for filling pressurized liquids, such as a carbonated beverage, it is important from the standpoint of safety to prevent the scattering of glass fragments upon the bursting thereof.

Various known protective sleeves of synthetic resin sheets have been used and subjected to a bottle bursting test, using the Japanese Industrial Standard S-2306 (Method of Fragment Retention Test for Carbonated Beverage Bottles) as a criterion of safety. As a result, it has been found that the bursting safety of such bottles (i.e., scattering of fragments) has an interrelationship with the tensile strength and elongation of the sheets employed as a protective cover.

More specifically, sleeve-forming sheets which satisfactorily pass the above bursting test are limited to only those having a tensile strength and elongation within a certain range, as shown in FIG. 5. FIG. 5 illustrates the results of the above bursting test, in which the axes indicate tensile strength and elongation of the sheets (measured in the peripheral direction thereof). It has also been found that sleeves made of sheets having a tensile strength or elongation smaller than a certain value fail to satisfactorily pass the test without exception. Also it has been found that sleeves made of sheets having a tensile strength or elongation exceeding a certain value may be quite dangerous, because when a bottle covered with such a sleeve bursts, fragments are scattered like shells in the axial direction of the bottle.

In the above-described tests, 300 ml glass bottles for carbonated beverages (weight: 170 g) were used. The tests were carried out in accordance with Japanese Industrial Standard S-2306, wherein the bottles were charged with an inner pressure of 4.0 to 4.5 $Kg/cm^2$ and dropped by a height of 75 cm at a temperature of 25° C. The tensile strength and elongation were measured on samples having a width of 10 mm and a length of 40 mm cut from the sleeves in the peripheral direction of the bottles.

Of the variety of synthetic resin sheets currently in practical use for shrinkable sleeves, polyvinyl chloride sheets, stretched polystyrene sheets, etc. can satisfy the requirements necessary to stand the above-described test.

In addition to the above-described bursting safety, protective sleeves are required to have good durability against vibrations and shocks which result, for example, during transportation of the bottles. However, the previously known sheets, including polyvinyl chloride and polystyrene sheets, are inferior in their ability to protect glass bottles against external forces and/or have inferior shock-absorbing properties. Furthermore, polyvinyl choride and stretched polyethylene sheets are also inferior in shrink-covering characteristics and the overall strengths thereof during use.

On the contrary, the foamed polystyrene sheets disclosed in U.S. Pat. No. 3,760,968 have excellent shock-absorbing properties, but have insufficient tensile strengths and elongations. The sheets, therefore, are inferior in safety upon bursting and lack practicability.

Accordingly, it is another object of the present invention to provide a sheet for forming a sleeve which has both superior shock-absorbing properties and bursting safety, as well as having good shrink-covering properties.

SUMMARY OF THE INVENTION

The present invention relates to a laminate for a sleeve used as a protective cover for a fragile article such as a glass bottle. The laminate has a specific shrinkage rate and comprises: (a) a foamed polystyrene film, and (2) a shrinkable film of non-foamed polystyrene, wherein the shrinkage rate of film (1) is greater than that of film (2) and the surface skin layer of film (1) is thicker on its surface not opposite film (2). The present invention also relates to a process of making such a laminate.

BRIEF DESCRIPTION OF THE DRAWINGS

FIG. 1 is a cross-sectional view of a laminated sheet of the present invention;

FIG. 4 is a cross-sectional view illustrating how a sleeve is used; and

DETAILED DESCRIPTION OF THE INVENTION

Figure 2:
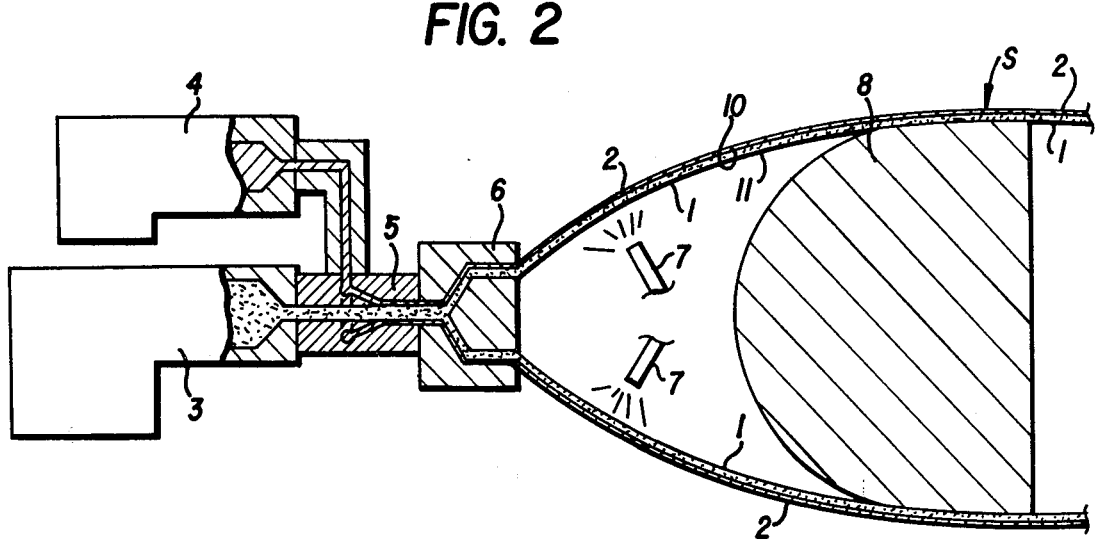
FIG. 2 is a cross-sectional view illustrating an example of an apparatus for producing a laminated sheet in accordance with this invention.
Figure 5:
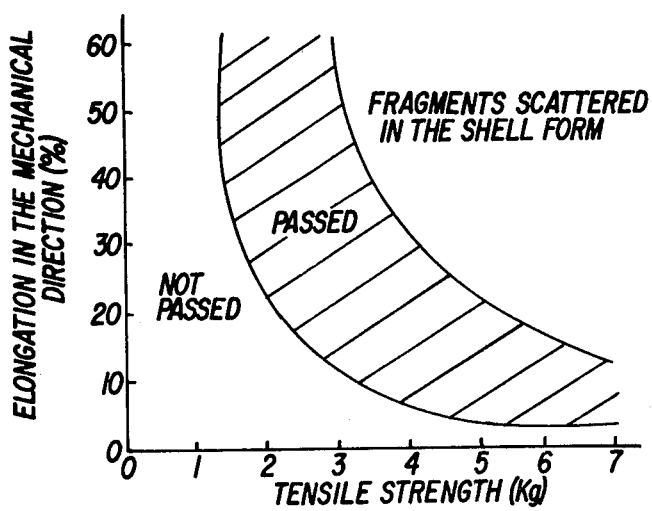
FIG. 5 is a graph illustrating usability of a sleeve material.

The present invention provides a laminated sheet for forming a sleeve comprising a laminate (hereinafter referred to as the "laminate") of a shrinkable foamed polystyrene film or sheet and a shrinkable non-foamed polystyrene film, wherein the foamed sheet has a rate of shrinkage greater than that of the non-foamed film. Also the surface skin layer of the foamed polystyrene is thicker on the side thereof not opposite the non-foamed film. The laminate (or laminated sheet) has a shrinkage rate of 60% or less in the direction of its flow (longitudinally) and a rate of shrinkage of 10% or less in the direction of its width (transversely), the longitudinal or lengthwise shrinkage rate being greater than the transverse or widthwise shrinking rate. Further, the laminate is bonded at both lengthwise ends so that the foamed sheet faces the inside of the sleeve.

The present invention includes a process for producing the laminate for forming a sleeve, which comprises concurrently extruding a foamed polystyrene film and a non-foamed polystyrene film to form the laminate and cooling the thus formed laminate wherein the foamed polystyrene film side of the laminate is cooled more quickly than the non-foamed polystyrene film side. This process results in the laminate having a shrinkage for the foamed film greater than that of the non-foamed film so that the surface skin layer of the foamed polystyrene film is thicker on the side of the foamed film not opposite non-foamed film. The process of the present invention includes stretching, either after or concurrently with the cooling of the laminate, whereby the stretching is effected at different degrees in the longitudinal direction and in the transverse direction, respectively, so as to attain a shrinkage rate of 60% or less in the longitudinal direction and a rate of shrinkage of 10% or less in the transverse direction, wherein the longitudinal shrinkage rate is greater than the transverse shrinkage rate.

In this specification, the term "surface skin layer" has the following meaning: The surface of the laminate is cooled immediately after extrusion thereof to effect a stretching. At this time, the inside of the foamed polystyrene film has well developed foams, whereas its surface layers have foams insufficiently developed due to the cooling as described above. As a result, the foamed polystyrene film has large foams in its inside and no or only small foams in its surface layers so that the size of foams in its cross-section are different. The layers having no or small foams are hereby designated as "surface skin layer".

With reference to the drawings, an embodiment of the present invention will hereinafter be described.

Sleeve-forming laminate (S) comprises a shrinkable, foamed polystyrene film (1) and a shrinkable non-foamed polystyrene film (2). Both the film (1) and film (2) are shrinkable by heat.

The shrinking property of said film (1) and film (2) is provided by stretching the films after their co-extrusion. The strength and the shrinkage rate can vary depending on conditions of shaping, including the rate of the stretching and the composition of resins used. As to the foamed film (1), the thickness of its surface skin layers formed on both surfaces thereof varies with the conditions of cooling upon its shaping. The sleeve-foaming laminate (S) according to the invention can, therefore, be produced by appropriately selecting the shaping conditions, the compositions of resins to be used and the like.

Examples of polystyrene resins to be used for the production of foamed film (1) are polystyrene polymers obtainable by polymerization of aromatic vinyl monomers, such as styrene, vinyltoluene, isopropylstyrene, α--methylstyrene, nuclear methyl styrenes, chlorostyrene and t-butylstyrene, and styrene copolymers containing more than 50% by weight of styrene residues can be obtained by copolymerizing a styrene monomer and another monomer, such as, for example, 1,3-butadine, alkyl acrylates (e.g., butyl acrylate, ehtyl acrylate, 2-ethylhexyl acrylate, etc.), alkyl methacrylates (e.g., methyl methacrylate, butyl methacrylate, 2-ethylhexyl methacrylate, etc.), acrylonitrile, vinyl acetate, α-methylethylene, divinylbenzene, dimethyl maleate, and diethyl maleate. These styrene resins are mixed with a foaming agent and then subjected to heating to form foamed polystyrene film (1). Examples of foaming agents usable in the present invention are: fatty hydrocarbons, such as propane, butane, isobutane, pentane, neopentane, isopentane, hexane and butadiene; alicyclic hydrocarbons such as cyclobutane, cyclopentane and cyclohexane; and halogenated hydrocarbons, such as methyl chloride, methylene chloride, dichlorofluoromethane, trichlorofluoromethane, dichlorodifluoromethane. The foaming agent may be used in an amount of from 0.1 to 0.7 moles, preferably from 0.2 to 0.5 moles, per Kg of said foamed sheet or film. The thickness of said foamed film may be from 0.1 to 1 mm. If the thickness thereof is less than 0.1 mm, insufficient shock-absorbing properties may result. If the thickness thereof is more than 1 mm, the film cannot be handled in the form of a roll because of an undesirable winding difficulty.

For the non-foamed film (2), the styrene resins used for the foamed sheet (1) can be used. The non-foamed film (2) may additionally include a rubber, such as butadiene and butene rubbers. The use of such a rubber makes it possible to arbitrarily control the stretching of non-foamed film (2) after its co-extrusion with the foamed film (1).

In the present invention, there must be a difference between the shrinkage rate of the non-foamed film (2) and that of the foamed film (1). If a laminate sheet of a foamed film (1) and a non-foamed (2) with identical shrinkage rates are used for forming a sleeve of a bottle, cracks may be generated in the non-foamed film (2) upon heat-shrinking thereof. In order to prevent the generation of cracks, the non-foamed film (2) must have a shrinkage rate smaller than that of the foamed film (1). It can therefore be advantageous to incorporate the above-described rubbers into the non-foamed film (2) so as to control its stretching.

The amount of rubbers to be included in the non-foamed film (2) may be less than 30% by weight, preferably from 2 to 25% by weight. If it exceeds 30% by weight, the film (2) may be undesirably attacked by a solvent contained in printing inks when subjected to printing. The non-foamed film may further include a pigment, such as titanium white so as to provide a decreased rate of transmittance, an increased rate of reflection, improved gloss of luster of its surface and an enhanced printability. The amount of pigments to be used is preferably less than 5% by weight.

The thickness of the non-foamed film (2) may be within the range of from 2 to 160μ. If the thickness thereof is less than 2μ, it may not have sufficient strength so that scratches may be generated during printing and, if the thickness thereof is more than 160μ, the film may undesirably have an inferior windability.

When shrinkable laminate comprising the foamed film and non-foamed film is printed, the outer surface of the non-foamed film may be partly attacked by solvents contained in printing inks. When such laminate is used to form a sleeve and shrunk to cover a glass bottle or a like article, small cracks may be generated on the printed surface of the film over the lapse of time or due to changes in atmospheric temperature. The above disadvantage can be avoided by imparting an improved solvent resistance to the non-foamed polystyrene film layer by incorporating polyethylene waxes therein.

The non-foamed film (2) may include 0.03 to 6.0% by weight of polyethylene waxes based on the weight of said styrene resins. If the amount is less than 0.03%, insufficient solvent resistance will result. If the amount is more than 6.0% by weight, the surface property of the film will deteriorate, undesirably resulting in an inferior printability. Most effective results can be attained when the waxes are used in an amount of from 0.03 to 4.0% by weight.

Polyethylene waxes which can be used in the present invention are low molecular polymers of polyethylenes produced either by polymerization of ethylene or by pyrolysis of polyethylenes. The molecular weight of polyethylene waxes may be from 500 to 15,000, preferably from 1,000 to 10,000. Polyethylene waxes having a molecular weight less than 1,000 have an undesirably low drop point (which is indicative of softening point (ASTM D5662)), so that decrease in the extrusion efficiency of the screw in the extruder may result upon extrusion of the film. Therefore, low molecular weight polyethylene waxes cannot be incorporated into the resin in an effective amount. On the contrary, polyethylene waxes having a molecular weight above 10,000 have an undesirably high drop point and, therefore, cannot be sufficiently admixed with the resin. The above-described range of molecular weight corresponds to the drop point of from about 60° to about 150° C. Polyethylene waxes having a drop point of from 90° to 150° C. are preferable.

In cases where the sleeve-forming sheet or laminate of the present invention is printed, an expansion may result in its planar direction (widthwise and lengthwise) each time it passes through the printing rollers because of the compression caused by the rollers in the direction of thickness of the sheet. This causes no problems in cases of mono-color printing. However, in cases of multi-color printing, this phenomonon results in undesirable shears in color. For example, it has been observed that when a sleeve-forming sheet according to the present invention with a thickness of 0.35 mm (of which the thickness of the non-foamed film is 15μ) and a width of 930 mm is subjected to a four-color printing, its width is expanded by 1.4 mm by the first printing, 0.4 mm by the second printing and 2 mm in total at the completion of the four-color printing.

In order to prevent such shears in color, it is possible to use printing plates having different sizes corresponding to the expansion of the sheet. However, preparation of such printing plates can be troublesome and costly, since the expansion of the sheet has to be measured and the printing plates must be resized each time the quality of the sheet is altered.

Alternatively, in the present invention, the above-described disadvantage can be avoided by compressing the sheet prior to printing. More specifically, the sleeve-forming sheet or laminate according to the invention may be passed through a pair of rollers having a predetermined gap, thereby compressing the sheet or laminate by 3 to 30% in the direction of its thickness and causing its width to be slightly expanded. The gap between the compression rollers may be 93 to 50% of the original thickness of the laminated sleeve-forming sheet. This results in the formation of a laminated sheet having a thickness reduced by 5 to 35%, which is measured immediately after its passing through the compression rollers. The thickness of the laminated sheet will eventually increase by its restoring force to give a sheet suited for printing compressed by 3 to 30% in the direction of its thickness.

If the compression rate or reduced thickness is less than 3%, the enlargement during printing may not be satisfactorily prevented. If it is more than 30%, rumples or folds may be generated on the surface of the laminated sheet during the compression due to shearing forces between the surface and the inside of the laminated sheet. The compression rollers can be used at ordinary temperature as well as at an elevated temperature, so that heating can be effected along with the compression. Examples of suitable compression rollers include a pair of rollers in which one is a hot roller having a diameter of 300 mm and the other a compression roller having a diameter of 100 mm, and a pair of rollers both of which have a diameter of 200 mm. If rollers with diameters which are too small are used, rumples may be generated in the laminated sheet as it passes therethrough, and cracks may also be generated when covered around the bottles.

The thus prepared pre-compressed sleeve forming sheet or laminate, when subjected to printing, will hardly be further compressed or expanded in its planar direction since it has been sufficiently compressed in advance. Accordingly, when the pre-compressed sleeve-forming sheet according to the present invention is used, it will no longer be necessary, even in multi-color printing, to adjust the dimensions of the printing plates prior to printing. Therefore, printing plates having identical dimensions can be used for each color.

In the present invention, the foamed polystyrene used for foaming the foamed film (1) may be additionally incorporated with rubbers in order to enhance the bursting safety thereof. Examples of such rubbers include those prepared from butadiene, butene, etc., which are identical with those usable in the non-foamed film (2). The amount of rubbers to be incorporated may be from 0.5 to 25% by weight, preferably from 0.5 to 15% by weight based on the total weight of the foamed film (1). The incorporation of such rubbers into the foamed sheet can contribute to the physical characteristics thereof, in particular, to the control of tensile strength and elongation. If the content of such rubbers exceeds 25% by weight, it is difficult to obtain sufficient shrinkability by stretching the step and the resulting sleeve will not exhibit sufficient shrink-covering properties.

Furthermore, the foamed film (1) and/or non-foamed film (2) according to the present invention may additionally include therein 0.01 to 3% by weight of plasticizers having a solubility parameter (SP) value of from 8 to 11. With incorporation of such plasticizers, the adhesion between the foamed film (1) and the non-foamed film (2) can be markedly improved because of the solvent effect of the plasticizers against polystyrene resins. The use of a plasticizer may also be useful to shorten the bonding time for the bonding of both ends of the laminated sheet when forming the sleeve. As described above, the SP value of plasticizers to be incorporated in the sheet of the invention is preferably from 8 to 11.0. This is because polystyrene resins used for the foamed film (1) and the non-foamed film (2) have an SP value of around 9.1.

Examples of plasticizers which can be used in the present invention include phthalates, such as diethyl phthalate (SP value: 9.0–10.0), dibutyl phthalate (9,4), di-2-ethylhexyl phthalate (9.0), dimethyl phthalate (10.5–10.7), dipropyl phthalate (9.75), diisooctyl phthalate (9.6), butylbenzyl phthalate (9.8), di-n-hexyl phthalate (9.1), dialphanyl phthalate (9.0) and dibutoxyethyl phthalate (8.0); esters of fatty acids, such as dioctyl adipate (8.6), dibutyl sebacate (9.2), butyl oleate (9.0) and dialphanyl sebacate (8.3); phosphoric esters, such as tricresyl phosphate (9.7) and triphenyl phosphate (10.5); ethyphthalyl ethyl glycolate (10.2); butylphthalyl butyl glycolate and the like.

If the amount of the plasticizer used exceeds 3% by weight, the adjustment of viscosity of the resins, when forming the laminated sheet by extrusion, may become difficult. This results in the generation of unevenness when stretching of the sleeve-forming sheet or laminate. If the amount is less than 0.01% by weight, no effective results, i.e., no sufficient lamination of the foamed film (1) and non-foamed film (2), can be obtained.

The incorporation of plasticizers can, therefore, be effective for preventing the foamed film (1) and non-foamed film (2) from peeling apart or separating when the sleeve-forming sheet (S) is shrunk onto bottles to form coverings when using the bottles which are covered with the laminated sheet (or sleeve) and, in particular, when washing the covered bottles by means of pressurized water.

In order to enhance the bursting safety of the bottles, there may be preferably used a sleeve-forming sheet having a tensile strength of from 1.5 to 7 Kg and an elongation of 13% or more, measured by Tensilon Tensile Tester (manufactured by Toyo Sokki Co., Ltd) on samples cut along the flow or longitudinal direction in a dumbbell shape of 10 mm (width)×40 mm (length).

As described hereinabove, the sleeve-forming sheet (S) can be prepared by concurrently extruding the foamed film (1) and the non-foamed film (2). An example of apparatus to be used for the production is shown in FIG. 2.

The apparatus is provided with an extruder (3) for foamed film (1) and an extruder (4) for non-foamed film (2). Molten resins extruded from the respective extruders meet at meeting zone (5), whereby the resin for forming the non-foamed film (2) encircles the resin for forming the foamed film (1). The combined flow of the resins progresses to a die head (6) having an annular slit for inflation shaping. The temperatures of the resins are set and/or maintained so that the resins have an identical viscosity at their melting point. This temperature control is necessary to maintain the ratio of the extruded resins as constant as possible so that the ratio of thickness between the foamed film (1) and the non-foamed film (2) can be controlled to a predetermined value in the laminated sheet formed therefrom.

The combined resins are extruded from the die head (6) in the shape of a double layered cylinder and then inflated into a shape of double layered envelope with the foamed sheet (1) on the inside and the non-foamed film on the outside thereof. Cooling is effected only on the inner side of foamed film (1) by means of cooling air from an air injector (7) or the like. By air cooling, the resins are solidified to form a laminated sheet consisting of foamed film (1) and non-foamed film (2). At the same time, the laminated sheet is stretched at a predetermined rate by being pulled forwardly along the outer surface of a plug (8), thus forming a shrinkable sleeve-forming sheet or laminate (S).

The air cooling may also be effected by means of air injectors provided on both sides of the cylindrical resin sheet wherein the amount of cooling air can be adjusted so that the inner surface of the laminate (the side of the foamed film) can be cooled more quickly than the outer surface of the laminate (the side of the non-formed film), thereby providing the same effect as above.

The stretching rate of the laminated sheet is controlled by the pull-up speed and blow-up ratio, which is determined by the ratio between the aperture of the die head (6) and the external diameter of the plug (8). The shrinkage rate of the sheet (S) in the directions of its flow and width is also determined in accordance with the above-described shrinkage rate.

The blow-up ratio is preferably in the range of 1.5 to 3.0. If it is less than 1.5, the sheet (S) may not shrink, but may even expand in the direction of its width. If it is more than 3, the sheet (S) will shrink to an extent not suitable for covering a glass bottle or a like article.

In the sleeve-forming sheet (S) produced in the above-described manner, the foamed film (1) can exhibit a greater rate of shrinkage than that of the non-foamed film (2) since the former is stretched under greater cooling than the latter. Further, in the foamed film per se, the surface skin layer formed on the side (11), which is not laminated with the film (2) and hence directly cooled with the air, is thicker than the skin surface layer formed on side (10), which is laminated to the film (2) and hence cooled indirectly. The side (11) of the foamed sheet (1), therefore, has a larger shrinkage rate than the side (10).

In the production of the sheet (S) according to the invention, the pulling speed, blow-up ratio and the stretching rate in the directions of its flow and width are so controlled that the resulting sheet (S) will have a rate of shrinkage of 60% or less in the direction of its flow (longitudinally) and a rate of shrinkage of 10% or less in the direction of its width (transversely) wherein the longitudinal shrinkage rate is greater than the transverse shrinkage rate.

It is noted that when the laminate of the present invention is formed into a sleeve, it is possible that its length in the direction of its flow (longitudinal) may be less than its width. Accordingly, the term "longitudinal" (or direction of flow) is equivalent to peripheral when a sleeve is so formed.

The foamed film (1) in the sleeve-forming sheet (S) contains remaining gases originated from the foaming agent, in an amount of not more than 0.3 mol/Kg at the time of heat-shrinkage. This is required to prevent peeling or separating and to prevent the generation of cracks in prints formed on the surface of the non-foamed film (2). The content of the remaining gas gradually decreases with the lapse of time after the production of the sheet. It is also possible, however, to adjust the content of the remaining gas intentionally, e.g., by use of hot rollers.

Figure 3:
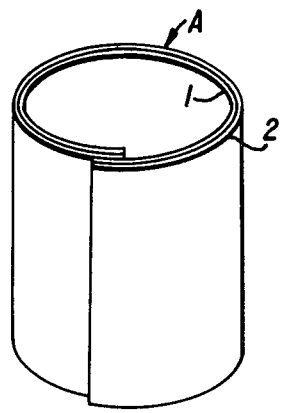
FIG. 3 is a perspective illustration of a sleeve.

The thus foamed sleeve-forming sheet or laminate (S) may be, if desired, printed or the like and then cut to a desired length to form a cylindrical sleeve (A). In preparing sleeve (A), the sheet (S) is wound into the shape of a cylinder with the foamed film (1) on the inside thereof and the flow or longitudinal direction of the sheet (S) coincided with the peripheral or circumferential direction of the sleeve (A), and the flow ends of the sheet (S), which may overlap slightly, are bonded by means of hot seal or similar method (FIG. 3).

The sleeve (A) is placed over a glass bottle (G) and then heat-shrunk to form a cover tightly contacted with the bottle (G) as shown in FIG. 4.

The sleeve (A), when shrunk in its peripheral direction, becomes thicker in the direction of its thickness. If this thickening is extremely large, bumps or waves may be formed and cracks may be generated on the printed surface of the sleeve (A) because of the difference in the shrinkage rate between the film (1) and film (2). Therefore, the size of the sleeve (A) relative to that of glass bottle (G) must be adjusted so that the sleeve, after heat shrinking, is less than two times that of its original thickness. With respect to the tightness and apprarance of the shrunken protective cover, the best results can be obtained when the sleeve (A) is of a size that there is a gap of about 1 mm between the bottle (G) and the sleeve (A) before the shrinkage thereof. The sleeve (A) of the invention can be used to protect not only glass bottles but also other fragile articles made of glass, china or the like.

EXAMPLE 1

(1) Extruder

In an apparatus such as that shown in FIG. 2, two extruders, each having a screw size of 90 mm, were used to effect a concurrent extrusion by the circular plug method, using a die having a diameter of 75 mm (slit width: 0.4 mm) and a plug having a diameter of 145 mm (which corresponds to a blow-up ratio of 1.93).

(2) Composition

| | (Parts by weight) |
|---|---|
| (a) Non-foamed film: | |
| Polystyrene | 71.4 |
| Styrene-butadiene copolymer (butadiene content 6%) | 23.8 |
| Titanium white | 4.8 |
| (b) Foamed film: | |
| Polystyrene | 100 parts |
| Butane | 0.345 mol (per Kg of polystyrene) |

(3) Process

The above-described resin (a) was melt-blended in extruder (4) and the above-described resin (b) was melt-blended in extruder (3). The resins progressed to the meeting zone or point (5), at which point resin (b) was covered with resin (a). At the meeting zone, resin (a) has a temperature of 181° C. and resin (b) 170° C.

Resins (a) and (b), after being layered at the meeting zone (5), were extruded through die (6) into the shape of a cylinder and pulled at a rate of 16 mm/min along the surface of plug (8), whereby both cooling and stretching of the resins were effected.

The air pressure used for the cooling was as follows:

| Against foamed sheet: | 1,500 mmAq | 1,800 mmAq |
|---|---|---|
| | or | |
| Against non-foamed sheet: | 150 mmAq | 0 mmAq |

The sheet was cut open and then passed through hot rollers (diameter: 100 mm) having a surface temperature of 92° C. to form a sleeve-forming sheet (S).

4. Characteristics of Sleeve-Forming Sheet

| Thickness: | 0.35 mm (non-foamed film: 15μ) |
|---|---|
| Amount of remaining gases: | 0.22 mol/Kg |
| Rate of shrinkage*: | Flow Direction 45% |
| | Width Direction 2% |
| Transmittance**: | Not more than 40% |

NOTES:
*Heated for 12 seconds in an oven of 130° C.
**Against visible light having wavelength of from 380 to 770 mμ

The resultant sleeve-forming sheet (S) was printed using a printing ink ordinarily used for foamed polystyrene sheets. Excellent print surfaces were obtained.

The resultant sleeve-forming sheet was bonded along the ends in its flow direction to form a sleeve (A). This sleeve was placed over a glass bottle preheated at a temperature of 68° C. and then heated in an oven for 10 seconds at a temperature of 160° C. to effect heat-shrinking. The thus formed shrunken sleeve was capable of providing the glass bottle with an excellent protective cover which, at the same time, had an excellent appearance and surface slippage property.

EXAMPLE 2

The sleeve-forming sheet obtained in Example 1 was passed through a pair of rollers (diameter 200 mm, each) having a gap of 0.2 mm and heated at a temperature of 87° C. After this compression treatment, the thickness of the sheet was 0.26 mm, and the compression ratio was 25.7%.

The resultant sheet had a remaining gas content (due to the foaming agent) of 0.22 mol/Kg (which was, therefore, 6 times in expansion). The sheet had a rate of shrinkage of 45% in its flow direction and 2% in the direction of its width (measured by heating it in an oven of 130° C. for 12 seconds). The transmittance of the sheet was 40% or less against visible light having a wavelength of 380 to 770 mμ.

The resultant sheet exhibited 0.2 mm enlargement in its widthwise direction when subjected to two-color printing, but no further enlargement when subjected to four-color printing and six-color printing. This means that the sheet possesses excellent printability when printed by a multi-color printing such that no shears or discrepancies in printed colors occur.

For comparison, when the sleeve-forming sheet obtained in Example 1 was passed through a pair of rollers (diameter: 220 mm) having a gap of 0.28 mm (compression ratio: 3%), the sheet exhibited 0.5 mm enlargement when subjected to two-color printing and further 0.1 mm enlargement when subjected to four-color printing. However, no further enlargement was observed when subjected to six-color printing. On the other hand, the sheet with the compression ratio of 35% exhibited compression ratio of 25.7%, but showed on its surface rumples due to excessive compression.

The above sheet and a similar sheet not containing any rubber in the non-foamed film were tested with respect to their tensile strength. The following results were obtained, as shown in Table I.

TABLE I

| | Non-Compressed | | Compressed (compression ratio: 25.7%) | |
|---|---|---|---|---|
| | Original sheet | Printed sheet | Original sheet | Printed sheet |
| Non-Rubber-containing Sheet | — | Shear in printing generated | 0.55 Kg | 0.44 Kg |
| | | | | Warp and cracks |

TABLE I-continued

|  | Non-Compressed | | Compressed (compression ratio: 25.7%) | |
|---|---|---|---|---|
|  | Original sheet | Printed sheet | Original sheet | Printed sheet |
| Rubber-containing Sheet (1.5% of butadiene rubber) | — | — | 1.05 kg partially generated after compression | 0.191 Kg |

NOTES:
Test Sample Used: Thickness: 0.35 mm
Size: 10 mm (width) × 45 mm (length) (Dumbbell shape)
Test Conditions: Samples were expanded at a rate of 1 mm/min, and the tensile strength at which cracks were generated is shown in TABLE I. (Average value of 5 points along the direction of width)

As is seen from the above Table I, shears in printing can be prevented by means of compression and also the generation of warp and cracks can be prevented by the incorporation of rubber into the composition of the non-foamed film.

EXAMPLE 3

Sleeve-forming sheets were prepared in a similar manner as in Example 1, with the exception that the compositions (a) for the non-foamed film consist of:

|  | (Parts by weight) |
|---|---|
| Polystyrene | 83.3 |
| Styrene-butadiene copolymer containing 6% of butadiene | 11.9 |
| Titanium white | 4.8 | and a polyethylene wax (PE Wax) in varying amounts.

The sheets were subjected to various tests, including printing tests, using a printing ink having the following composition:

|  | (By weight) |
|---|---|
| Alcohol | 40% |
| Toluene | 12% |
| Ethyl acetate | 6% |
| Pigment | 20% |
| Acrylic resin | 15% |
| Fiber resin | 7% |

The generation of cracks due to attack by the solvent contained in the printing ink was observed. The results of this test and other tests are shown in the following Tables II and III.

The above tests were conducted by the following procedures:

Tensile Test
Tester: Tensilon Tensile Tester (manufactured by Toyo Kokki Co., Ltd)
Sample: 10 mm (width) × 40 mm (length) in dumbbell shape.
Samples were elongated at a rate of 1 mm/min at room temperature.

TABLE II

| | | | | Characteristics of the Original Sheet | | | | | |
|---|---|---|---|---|---|---|---|---|---|
| | | Basis | | Shrinking Rate % | | | | | |
| Experiment No. | Amount of PE Wax* | Weight (g/m²) | Thickness (μ) | Flow Direction | Direction of Width | Elongation** (mm) | Solvent Resistance (sec) | Appearance | Printability |
| 1 | 0 | 87 | 18 | 44 | 3 | 1.95 | 10 | 0 | 0 |
| 2 | 0.02 | 85 | 19 | 44 | 3 | 2.41 | 12 | 0 | 0 |
| 3 | 0.03 | 85 | 18 | 44 | 3 | 2.69 | 15 | 0 | 0 |
| 4 | 0.05 | 85 | 18 | 45 | 3 | 2.83 | 16 | 0 | 0 |
| 5 | 0.5 | 84 | 18 | 42 | 3 | 4.07 | 20 | 0 | 0 |
| 6 | 4.0 | 83 | 19 | 42 | 3 | 5.95 | 26 | Δ uneven | 0 |
| 7 | 6.0 | 84 | 19 | 43 | 3 | 6.18 | 27 | Δ uneven | 0 |
| 8 | 7.0 | 85 | 19 | 43 | 3 | 6.21 | 28 | X uneven | X uneven |

*per 100 parts of polystyrene
**in the widthwise direction
0 = acceptable
Δ = slightly uneven, but acceptable
X = uneven and unacceptable.

TABLE III

| | Crack Test | | | | Overall Rating | | |
|---|---|---|---|---|---|---|---|
| Experiment No. | Ordinary Temperature | 5° C. | −5° C. | −20° C. | Printability | Crack | Judgment |
| 1 | 20 days | 26 hr. | 3 hr. | 2 hr. | 0 | X | NG |
| 2 | 3 mon. | 9 days | 3 days | 6 hr | 0 | X | NG |
| 3 | >6 mon | >30 days | 28 days | 20 days | 0 | 0 | OK |
| 4 | >6 mon | >30 days | >30 days | 25 days | 0 | 0 | OK |
| 5 | >6 mon | >30 days | >30 days | >30 days | 0 | 0 | OK |
| 6 | >6 mon | >30 days | >30 days | >30 days | 0 | 0 | OK |
| 7 | >6 mon | >30 days | >30 days | >30 days | 0 | 0 | OK |
| 8 | >6 mon | >30 days | >30 days | >30 days | X | 0 | NG |

O = acceptable
X = unacceptable

Solvent Resistance

A solvent (toluene=alcohol=1:1) was dropped onto the surface of a sample by an injector and the sample was untouched until a hole was made therein. The time from the dropping of the solvent to the formation of the hole was measured.

Appearance and Printability

Ink acceptability and unevenness at the time of printing were observed by the eye.

Crack Test

A heat-shrunken cover was formed on a glass bottle and the resulting bottle was kept at a prescribed temperature until cracks were formed on the surface of the cover. The time required for the gneration of cracks was measured. In the table, ">30 Days" means that no cracks were observed after 30 days.

It is apparent from the above experiments that no cracks are generated in the printed sleeve when polyethylene wax is incorporated into the non-foamed sheet in an amount in the range of from 0.03 to 6.0 parts.

EXAMPLE 4

Sleeve-forming sheets were prepared in the same manner as in Example 1, with the exception that the composition (a) for the non-foamed film consisted of:

|  | (Parts by weight) |
|---|---|
| Polystyrene | 66.7 |
| Styrene-butadiene copolymer (butadiene content: 6%) | 28.6 |
| Titanium white | 4.7 | and between 0.005 to 4 parts by weight of a plasticizer, as shown in Table IV. The results obtained are shown in the following Table IV:

In Table IV, the following abbreviations were used with regards to plasticizers:

| BS: | Butyl Stearate |
|---|---|
| PO: | Parrafin Oil |
| DP: | Dibutoxyethyl Phthalate |
| DOA: | Dioctyl Adipate |
| TP: | Triphenyl Phosphate |
| TES: | Toluene Ethyl Sulfoamide |
| DOP: | D-2-ethylhexyl Phthalate |

As is shown in Table IV, an excellent adhesion and heat seal can be obtained between the foamed sheet and non-foamed film by including 0.01 to 3% by weight of plasticizers having a solubility parameter (SP value) in the range of 8 to 11.0 in the composition of the foamed film and/or non-foamed film.

EXAMPLE 5

Sleeve-forming sheets were prepared in a similar manner as in Example 1, with the exception that the content of butadiene in the composition (a) for the non-foamed film was varied in an amount of from 3 to 30% by weight and up to 25% by weight of butadiene was additionally included in the composition (b) for the foamed film.

The resulting sheets or laminates were printed on the non-foamed film side, cut to an appropriate size and wound in the shape of a slightly-overlapping cylinder with the foamed film facing inside and the flow direction of the sheet coinciding with the peripheral direction of the cylinder. Thereafter, the ends of the sheets in the flow direction were heat sealed to form sleeves. The sleeves were heat shrunk onto pressure-resistant (resistant to a pressure of 21 to 30 Kg/cm$^2$) glass bottles filled with carbonated beverages to form coverings therefor.

Safety of these covered bottles were evaluated by the bottle-bursting test according to JIS S-2360. The results obtained are shown in the Table V below. The condi-

TABLE IV

| Sample | PSP Thickness (mm) | Film Thickness ($\mu$) | Plasticizer Name | Plasticizer SP Value | Plasticizer Amount Used (% by weight) | Peel-off Strength ($\times 10^{-2}$Kg) | Occurrence of Peel-off (percent) | Quality | Rating | Hot Seal Property Temp (°C.) | Hot Seal Property Time (sec) |
|---|---|---|---|---|---|---|---|---|---|---|---|
| 1 | 0.4 | 20 | BS | 7.5 | 3 | 4.5 | 25 |  | X | 155 | 9.0 |
| 2 | " | 18 | PO | 7.5 | 3.5 | 4.4 | 26 |  | X | " | 10.0 |
| 3 | " | 19 | DP | 8.0 | 0.005 | 4.9 | 20 |  | X | " | 9.5 |
| 4 | " | 19 | DP | 8.0 | 0.01 | 5.5 | 5 |  | O | " | 8.5 |
| 5 | " | 20 | DP | 8.0 | 3.0 | 7.5 | 0 |  | O | " | 7.5 |
| 6 | " | 19 | DOA | 8.5 | 4.0 | 7.7 | — | uneven surface | X | " | — |
| 7 | " | 19 | TP | 10.5 | 0.01 | 5.7 | 2 |  | O | " | 8.0 |
| 8 | " | 18 | TP | 10.5 | 3.0 | 7.9 | 0 |  | O | " | 7.0 |
| 9 | " | 18 | TP | 10.5 | 4.0 | 8.1 | — | uneven surface | X | " | — |
| 10 | " | 20 | TES | 11.9 | 0.01 | 4.1 | 15 |  | X | " | 9.0 |
| 11 | " | 20 | TES | 11.9 | 3.0 | 4.8 | — | uneven surface | X | " | — |
| 12* | " | 20 | DOP | 9.0 | 0.01 | 5.8 | 0 |  | O | " | 7.5 |

*In Sample 12, plasticizer was incorporated into the foamed sheet
O = acceptable
X = unacceptable In the physical properties of the respective samples in Table IV, the peel-off strength was measured by peeling a test sample of 20 mm (width)×100 mm (length) at a rate of 100 mm/min. The peel-off occurrence was measured by injecting water pressurized at 3 Kg/cm$^2$ through a nozzle having a diameter of 5 mm onto the surface of test samples identical with the ones used in the above measurement.

tions of the test were as follows: Glass bottles (300 ml) were ruptured by an inner pressure of 4.0 to 4.2 Kg/cm$^2$. Bottles where more than 95% of the total mass of scattered fragments remained within a radium of 100 cm are considered to have passed this test.

As is apparent from Table V, the bottles covered with a laminate having butadiene rubber only in the non-foamed film do not pass the bottle bursting test, whereas the bottles covered with a laminate having butadiene rubber both in the foamed and non-foamed films pass the test.

As described hereinabove, the sleeve-forming sheet produced in accordance with the process of the present invention has the advantages summarized below.

The sleeve-forming sheet is a laminate of a shrinkable foamed polystyrene film and a shrinkable non-foamed film. A sleeve formed from the sleeve-forming sheet, therefore, has a smooth and even outer surface consisting of the non-foamed film which has an excellent printability and can therefore be printed

TABLE V

| Sample | Content of Rubber (percent by weight) | | Elongation (%) | | Tensile Strength (Kg) | Bottle Bursting Test |
|---|---|---|---|---|---|---|
| | Foamed Film | Non-Foamed Film | Foamed Sheet | Laminated Sheet | | |
| 1 | 0 | 3 | 7.3 | 7.5 | 3.3 | Not passed |
| 2 | 0.5 | 6 | 10.2 | 18.7 | 3.1 | passed |
| 3 | 3 | 3 | 11.0 | 13.2 | 3.2 | " |
| 4 | 3 | 6 | 11.2 | 18.7 | 2.9 | " |
| 5 | 3 | 9 | 11.5 | 19.5 | 2.8 | " |
| 6 | 3 | 15 | 12.0 | 21.3 | 2.8 | " |
| 7 | 3 | 25 | 11.9 | 22.6 | 2.6 | " |
| 8 | 6 | 6 | 14.6 | 18.9 | 2.5 | " |
| 9 | 6 | 9 | 15.0 | 20.1 | 2.4 | " |
| 10 | 6 | 15 | 15.1 | 22.1 | 2.3 | " |
| 11 | 9 | 9 | 17.5 | 21.6 | 2.3 | " |
| 12 | 9 | 15 | 17.1 | 22.3 | 2.3 | " |
| 13 | 15 | 15 | 17.6 | 23.7 | 2.1 | " |
| 14 | 25 | 6 | 17.3 | 19.6 | 2.3 | " |
| 15 | 25 | 25 | 17.9 | 31.6 | 1.9 | " |
| 16 | 25 | 30 | 18.2 | 39.9 | 1.8 | " |
| 17 | 30 | 25 | 19.8 | 33.9 | 1.3 | " | with a smaller amount of ink. The film also has excellent strength and scretch resistance. The inner sheet of polystyrene has an excellent shock-absorbing property. Accordingly, the sleeve formed from the sheet of the present invention provides greatly increased protection for bottles so that a bottle having thinner walls can be used along with the sleeve and, hence, the weight of the bottle can be reduced to only about ½ that required in the prior art. This also reduces its cost and transportation load. The sleeve formed from the sheet of the invention also has an improved slippage property so that bottles covered with the sleeve can be transported smoothly with lesser friction between the bottles by means of vibration conveyor, chute or the like. Accordingly, no halting or stagnancy occurs in the course of their transporation, unlike the cases of the prior art.

In the sleeve according to the invention, the inner foamed sheet has a greater shrinkage rate than that of outer non-foamed film. Therefore, upon the shrinkage of the sleeve, the inner sheet, which has to shrink in a greater rate than the outer film, can form an intimately close contact with a glass bottle to be covered, thereby leaving no spaces or gaps therebetween. In addition, no waves or folds are formed in the sleeve at the shoulder and bottom portions of the bottles, thus insuring a secured attachment therebetween.

The foamed film per se has a thicker surface skin layer on the side which contacts with glass when compared to the side laminated with the non-foamed film. This aspect of the foamed film improves its coherence with the glass bottle and its shrinkage property.

Moreover, in the present invention, the laminated sheet as a whole has a greater shrinkage rate in the direction of its flow than in the direction of its width. The sleeve is formed from the laminated sheet by winding it into a cylindrical form with its flow direction coinciding with the peripheral direction of the sleeve, followed by bonding the respective ends thereof togteher. As a result, the sleeve, when shrunk onto the surface of a bottle, shrinks mainly in its peripheral direction with almost no shrinking in its axial direction, thereby insuring that a bottle will be covered over any prescribed portions thereof.

In accordance with the present invention, the sleeve-forming sheet can be produced quite efficiently by means of a concurrent extrusion, whereby the above-described differences in the rate of shrinkage, as well as in the thickness of surface skin layers, can be readily provided by cooling the two sides of the sheet at different rates. In addition, a greater difference in the rate of shrinkage between the foamed film and the non-foamed film can also be insured by the addition of a rubber thereto.

The process of the present invention has the advantage that all steps, including the adjustment of rate of stretching in the direction of flow and width of the sheet, can be carried out in a continuous manner with high efficiency and low production costs.

What is claimed:

1. A sleeve comprising a laminated sheet having a more highly shrinkable foamed film and a lesser shrinkable non-foamed film, said films comprising polystyrene containing more than 50% by weight of styrene residues, said non-foamed film also comprising rubber in an amount not more than 30% by weight;
   flow-direction ends of said laminated sheet being bonded together so that a thicker skin surface of said foamed film faces the interior of said sleeve;
   said laminated sheet having a flow-direction shrinkage rate of 60% or less and a widthwise shrinkage rate of 10% or less, said flow-direction shrinkage rate being greater than said widthwise shrinkage rate.

2. A sleeve as described in claim 1 wherein said non-foamed film also comprises a titanium white in an amount of 5% or less.

3. A sleeve as described in claim 1 wherein said non-foamed film also comprises a polyethylene wax in an amount of 0.03 to 6.0% by weight, based on the weight of said polystyrene resin.

4. A sleeve as described in claim 1 wherein said foamed polystyrene film also comprises a rubber in an amount of from 0.5 to 25% by weight.

5. A sleeve as described in claim 1 wherein at least one of said foamed film and said non-foamed film also comprises 0.01 to 3% by weight of plasticizers having a solubility parameter in the range of 8 to 11.0.

6. A sleeve as described in claim 1 wherein said laminated sheet has been compressed by 3 to 30% in the direction of its thickness.

7. A sleeve as described in claim 1 wherein said laminated sheet has an elongation of not less than 13% and a longitudinal tensile strength of 1.5 to 7 Kg.

8. A process for producing a sheet for forming a sleeve which comprises:
   forming a laminated sheet by concurrently extruding a foamed polystyrene film and a non-foamed polystyrene film;
   cooling said foamed film more quickly than said non-foamed film, so that said foamed film has a higher shrinkage rate than said non-foamed film, and said foamed film has a surface skin layer thickner on its side opposite that laminated to said non-foamed film;

stretching said laminated sheet at different rates relative to the flow and widthwise directions of said laminated sheet, so that the resulting flow-direction shrinking rate is greater than the widthwise shrinking rate and is 60% or less and said widthwise shrinkage rate is 10% or less.

9. A laminate comprising a sheet having a more highly shrinkable foamed film and a lesser shrinkable non-foamed film, said films comprising polystyrene, said foamed film having a skin surface thicker on its side opposite that laminated to said non-foamed film;

said laminated sheet having a flow-direction shrinkage rate of 60% or less and a widthwise shrinkage rate of 10% or less, said flow-direction shrinkage rate being greater than said widthwise shrinkage rate.

10. The laminate as described in claim 9 further comprising a glass bottle wherein the flow direction edges of said sheet are bonded together so as to form a sleeve enclosing said bottle.

11. The laminate as described as in claim 10 wherein the sheet is adhered to the bottle by heat shrinking.

12. A sleeve as described in claim 1 wherein said non-foamed film comprises 2 to 25% by weight rubber.

13. A sleeve as described in claim 1 wherein said foamed film contains remaining gases originated from the foaming agent in an amount of not more than 0.3 mol/kg at the time of heat-shrinkage.

* * * * *